US008646683B2

(12) United States Patent
Koplar

(10) Patent No.: US 8,646,683 B2
(45) Date of Patent: Feb. 11, 2014

(54) METHOD AND SYSTEM FOR DEVICE NOTIFICATION

(75) Inventor: Edward J. Koplar, St. Louis, MO (US)

(73) Assignee: Koplar Interactive Systems International L.L.C., St. Louis, MO (US)

(*) Notice: Subject to any disclaimer, the term of this patent is extended or adjusted under 35 U.S.C. 154(b) by 723 days.

(21) Appl. No.: 12/577,592

(22) Filed: Oct. 12, 2009

(65) Prior Publication Data

US 2010/0089996 A1 Apr. 15, 2010

Related U.S. Application Data

(63) Continuation-in-part of application No. 12/263,101, filed on Oct. 31, 2008, now abandoned.

(60) Provisional application No. 60/984,248, filed on Oct. 31, 2007, provisional application No. 60/987,320, filed on Nov. 12, 2007, provisional application No. 61/029,704, filed on Feb. 19, 2008.

(51) Int. Cl.
*G06F 17/00* (2006.01)
*G06K 7/10* (2006.01)
*G06K 9/22* (2006.01)

(52) U.S. Cl.
USPC ............................................ 235/375; 462/45

(58) Field of Classification Search
USPC .......... 235/462.45, 462.46, 462.47, 375, 383; 705/64; 455/418
See application file for complete search history.

(56) References Cited

U.S. PATENT DOCUMENTS

| 6,766,956 B1 * | 7/2004 | Boylan et al. ............ 235/462.45 |
| 2005/0203854 A1 * | 9/2005 | Das et al. ........................ 705/64 |
| 2007/0060114 A1 * | 3/2007 | Ramer et al. .................. 455/418 |

* cited by examiner

*Primary Examiner* — Thien T Mai
(74) *Attorney, Agent, or Firm* — Christopher R. Carroll; The Small Patent Law Group LLC

(57) ABSTRACT

Methods and system for encoded information processing are described. In one embodiment, an encoded pattern may be optically detected from source media. The encoded pattern may be associated with programming content of a content source. The encoded pattern may be decoded to reproduce encoded data. The programming content may be identified based on reproduction of the encoded data. A scheduled start time of the programming content may be obtained. When a current device time is within a notification time qualification of the scheduled start time, a programming content start alert may be generated. An interactive opportunity notification associated with the programming content may be provided based on generation of the programming content start alert. Additional methods and systems are disclosed.

20 Claims, 5 Drawing Sheets

METHOD AND SYSTEM FOR DEVICE NOTIFICATION

CROSS-REFERENCE TO RELATED APPLICATIONS

This application is a continuation-in-part of U.S. patent application entitled "Method and System for Encoded Information Processing", Ser. No. 12/263,101, filed 31 Oct. 2008, which claims the benefit of U.S. Provisional Patent Applications entitled "Method and System for Pattern Processing", Ser. No. 60/984,248, filed 31 Oct. 2007, "Method and System for Pattern Processing", Ser. No. 60/987,320, filed 12 Nov. 2007, and "Method and System for Encoded Information Processing", Ser. No. 61/029,704, filed 19 Feb. 2008, the entire contents of the applications are herein incorporated by reference.

FIELD

The present application relates generally to the technical field of information processing. In specific examples, the present application relates to a method and system for device notification.

DETAILED DESCRIPTION

Example methods and systems for device notification are described. In the following description, for purposes of explanation, numerous specific details are set forth in order to provide a thorough understanding of example embodiments. It will be evident, however, to one of ordinary skill in the art that embodiments of the invention may be practiced without these specific details.

A bar code or other another type of encoded pattern may be detected optically from printed matter or a display device (e.g., a television) on a mobile electronic device. The encoded pattern may contain identification of programming content. After obtaining the start time of the programming content from the encoded pattern or a different source, an alert may be scheduled on the mobile electronic device. At the appropriate time (e.g., 5 or 10 minutes) before start time of the programming content, a user of the mobile electronic device may be provided with an interactive opportunity notification that alerts the user that certain programming material will be broadcast.

Figure 1:
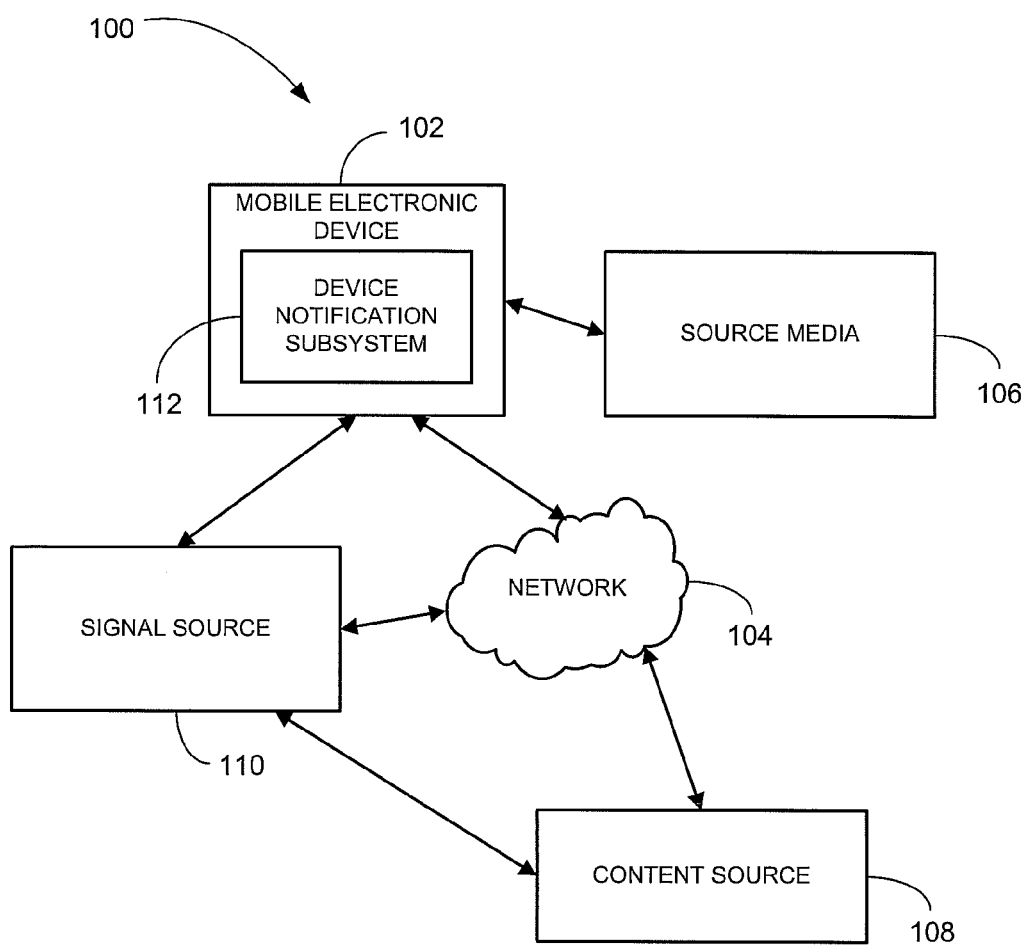
FIG. 1 is a block diagram illustrating a system, according to an example embodiment.

FIG. 1 illustrates an example system 100 in which a mobile electronic device 102 may optically detect an encoded pattern from source media 106 and/or receive identification data (e.g., from a signal source 110) to provide an interactive opportunity notification on the mobile electronic device 102 to alert a user of the mobile electronic device 102 that upcoming programming content contains an interactive opportunity.

The mobile electronic device 102 may be a portable gaming device, a mobile telephone, a smart card, a portable computer, or the like. Other types of mobile electronic devices may also be used. In some embodiments, the mobile electronic device 102 includes an optical detector to record electronic images (e.g., photos) and otherwise receive visual data. In some embodiments, the mobile electronic device 102 includes a timer to schedule certain events on the mobile electronic device 102. The timer may be a universal timer (e.g., a timer that enables operation in a variety of geographic locations having different time zones), which may be programmed based on a determined geographic location of the mobile electronic device 102 or a time zone associated with mobile electronic device 102.

The mobile electronic device 102 may include a lighting component (e.g., a red LED or other visual display), sound reproduction circuitry, and/or a vibration component to alert the user of the mobile electronic device 102 of upcoming programming content that includes interactive opportunities.

In an example embodiment, the mobile electronic device 102 may include a CMOS imaging sensor, a 32-bit microprocessor and external memory. For example, the hardware of the mobile electronic device 102 may include OEM part number: 5080SR-1212A0R by Honeywell Imaging and Mobility, a color CMOS imaging device (e.g., the OmniVision OV7670) and a 32-bit microcontroller (e.g., the Sunplus SPG293A). The encoded pattern decoding software may be ADAPTEC from Honeywell Imaging and Mobility. However, other configurations of hardware and software may also be used.

In some embodiments, various devices and sources in the system 100 use a network 104 for communication. The network 104 may be a television distribution network, Global System for Mobile Communications (GSM) network, an Internet Protocol (IP) network, a Wireless Application Protocol (WAP) network, and/or a WiFi network. Other networks may also be used.

The source media 106 is a medium in which the encoded pattern is present and may be detectable by an optical detector of the mobile electronic device 102. For example, the source media 106 may include printed media (e.g., a newspaper article), electronic media (e.g., a web page), a frame of a video signal, and other types of visual media that are capable of visually presenting an encoded pattern.

In some embodiments, the encoded pattern is visible in the source media 106. In some embodiments, the encoded pattern is substantially invisible in the source media or subliminally encoded in the source media 106. The encoded pattern may be otherwise visually presented in the source media 106.

The source media 106 may, in an example embodiment, be provided by the signal source 110. For example, a signal source 110 may provide the web page with the encoded pattern as the source media 106 to a user of the mobile electronic device 102. In another example, the signal source 110 may provide a video signal with the encoded pattern on one or more frames of the video signal as the source media 106 to the user of the mobile electronic device 102.

The content source 108 provides programming content to the signal source 110 through a transmission or otherwise. The content source 108 may be a television station, a radio station, a cable provider, a satellite television provider, a satellite radio provider, an Internet website, or the like. The programming content provided by the content source 108 may include radio programming content, television programming content, or the like. For example, the radio programming content may include FM, AM, XM, Internet radio, or other audio transmissions. The video programming content may include broadcast, cable, satellite, Internet video (e.g., streaming or downloadable video), or other video transmissions. The programming content may be provided in real-time from the content source 108, may be provided at a delay, may be downloadable to the mobile electronic device 102 for viewing, or may otherwise be provided from the content source 108.

The signal source 110 presents programming content received from the content source 108. Examples of the signal source 110 include a display device (e.g., a television), an audio reproduction device (e.g., a radio), or the like. The programming content may include an encoded audio signal, an encoded video signal, or a different type of content signal. The programming content may include encoded information that is visible or subliminally encoded to provide an interactive or promotional opportunity to a user of the mobile electronic device 102.

The interactive opportunity may be presented on the mobile electronic device 102 based on a presentation being made on the signal source 110. For example, the interactive opportunity may be a special coupon or opportunity that a user of the mobile electronic device 102 can download based on viewing the programming content. One or more signal sources 110 may be used.

The mobile electronic device 102 includes in some embodiments a device notification subsystem 112 to obtain a start time of the programming content, scheduled an alert on the mobile electronic device 102, and then notify a user of the mobile electronic device 102 that an interactive opportunity notification will be present in certain programming material will be broadcast. The alert may be based on a start time of the programming content, a current time, the content source 108, and/or a current geographic location of the mobile electronic device 102.

Multiple mobile electronic devices 102 may operate in the system 100, with each device being operated by a different user. Some of the multiple mobile electronic devices 102 may include the device notification subsystem 112 to be alerted to and/or receive interactive opportunities, while other mobile electronic devices 102 without the device notification subsystem 112 may not be alerted and/or receive the interactive opportunities.

Figure 2:
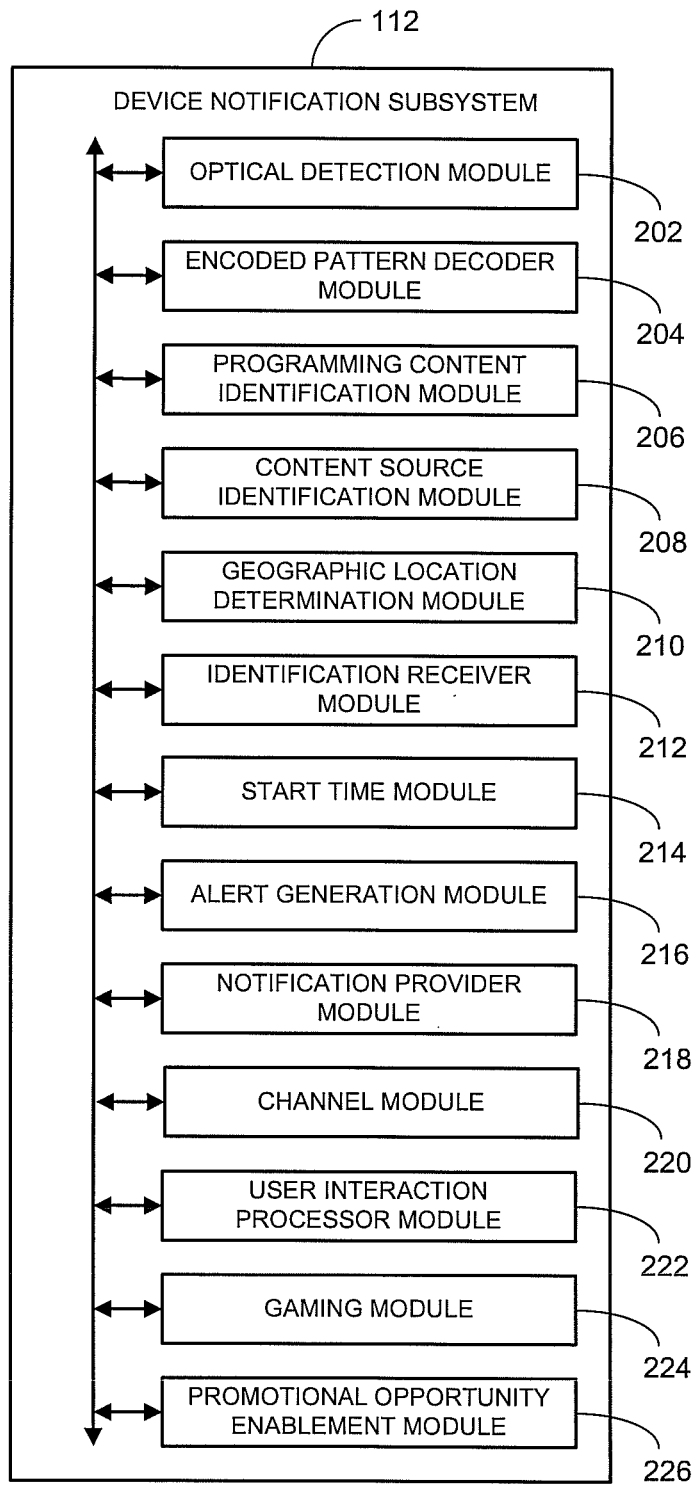
FIG. 2 is a block diagram illustrating an example device notification subsystem that may be deployed in the mobile electronic device of FIG. 1, according to an example embodiment.

FIG. 2 illustrates an example of a device notification subsystem 112 that may be deployed in the mobile electronic device 102 of the system 100 (see FIG. 1), or may be otherwise deployed. The inclusion of the device notification subsystem 112 on the mobile electronic device 102 may, in an example embodiment, provide the user of the mobile electronic device 102 with a notification of the future broadcasting of programming content with interactive opportunities.

The device notification subsystem 112 may include an optical detection module 202, an encoded pattern decoder module 204, a programming content identification module 206, a content source identification module 208, a geographic location determination module 210, an identification receiver module 212, a start time module 214, an alert generation module 216, a notification provider module 218, a channel module 220, a user interaction processor module 222, a gaming module 224, and/or a promotional opportunity enablement module 226. Other modules may also be included. In various embodiments, the modules may be distributed so that some of the modules may be deployed in the mobile electronic device 102 and some of the modules may be deployed in an additional device (e.g., an additional mobile electronic device 102). In one particular embodiment, the device notification subsystem 112 includes a processor, memory coupled to the processor, and a number of the aforementioned modules deployed in the memory and executed by the processor.

In some embodiments, the encoded pattern is optically detected from the source media 106 by the optical detection module 202. The encoded pattern may be detected based on a specific request of the user of the mobile electronic device 102 (e.g., by taking a picture of a bar code present in a magazine), or may be automatically detected by the mobile electronic device 102 (e.g., by the user aiming the mobile electronic device 102 at a television during a broadcast of programming content until the encoded pattern is received).

The encoded pattern may be a bar code or other machine-readable representations of data in a visual form. The bar code may be one-dimensional such as a UPC bar code. The bar code may be multi-dimensional (e.g., two-dimensional bar codes such as an Aztec code, Data Matrix, Dataglyph, MaxiCode, PDF317, QR Code, Ultra Code or UCC RSS-2D bar code). Other types of bar codes may also be used.

Once the encoded pattern is received, the encoded pattern decoder module 204 decodes the encoded pattern to reproduce encoded data. The encoded data may include information that can be used to identify the programming content, identify the content source 108, identify the start time of the programming content, and the like. Other information may also be included.

After the encoded pattern is decoded, the programming content identification module 206 identifies the programming content based on reproduction of the encoded data by the encoded pattern decoder module 204. The identification of the programming content alerts the mobile electronic device 102 of upcoming programming content that includes an interactive opportunity for which a notification is to be provided on the mobile electronic device 102.

The content source identification module 208 may be deployed in the device notification subsystem 112 to identify the content source 108. The identification of the content source 108 of the programming content alerts the mobile electronic device 102 of the content source 108 of the upcoming programming content that includes interactive opportunities for which a notification should be provided on the mobile electronic device 102.

In some embodiments, content source identification module 208 identifies the content source 108 directly from the reproduction of the encoded data. In some embodiments, the content source identification module 208 identifies the content source 108 by comparing the programming content identified from the reproduction of the encoded data against a content listing (e.g., an electronic program guide) to identify the content source 108 that will broadcast the programming content with the interactive opportunities. The content source identification module 208 may otherwise identify the content source 108. The system 100 may have multiple content sources 108, and the identification performed by the content source identification module 208 may identify the particular content source 108 that has the upcoming programming content with one or more interactive opportunities.

The geographic location determination module 210, when deployed, determines the geographic location of the mobile electronic device 102. The determination of the geographic location of the mobile electronic device 102, in some embodiments, enables the device notification subsystem 112 to identify the content source 108 of the programming content with the interactive opportunities, the starting time of the programming content, or both. In an example embodiment, the geographic location may be used to properly schedule the timing of the alert based on a universal timer of the mobile electronic device 102.

In one embodiment, the geographic location determination module 210 obtains global positioning system (GPS) data on the mobile electronic device 102 and identifies the geographic location of the mobile electronic device 102 based on the GPS data. In another embodiment, the geographic location determination module 210 identifies a time zone setting on the mobile electronic device 102 and identifies the geographic location of the mobile electronic device 102 based on the time zone setting.

In some embodiments, the identification receiver module 212 receives identification of a programming content, a content source of the programming content, or both. For example, the identification may be received through short message service (SMS), e-mail, or may otherwise be received. The identification receiver module 212 may be used instead of the optical detection module 202, the encoded pattern decoder module 204, the programming content module 206, and/or the content source identification module 208 to obtain identification of the programming content, the content source 108, or both.

The start time module 214 obtains or determines a scheduled start time of the programming content. In an example embodiment, the start time module 214 identifies the scheduled start time of the programming content based on the decoding of the encoded pattern.

In some embodiments, the encoded data that is reproduced based on the decoding of the encoded pattern may identify the start time of the programming content. In some embodiments, the start time module 214 receives the scheduled start time of the programming content from the content source 108 of the programming content. The scheduled start time may be received through e-mail, SMS, or otherwise received. The start time of the programming content may be otherwise obtained.

Once the start time is obtained, the alert generation module 216 generates a programming content start alert to occur at a particular time. The generated programming content start alert occurs when a current device time (e.g., of the mobile electronic device 102) is within a notification time qualification of the scheduled start time. For example, when the notification time qualification is fifteen and thirty minutes, the mobile electronic device 102 will generate a first programming content start alert to occur at fifteen minutes before the start time of the programming content and will generate a second programming content start alert to occur at thirty minutes before the start time of the programming content.

In some embodiments, the programming content start alert is generated immediately after the start time is obtained by the start time module 214. The programming content start alert may then be scheduled to occurred at a later time. In some embodiments, the programming content start alert is generated when the current device time is within the notification time qualification of the scheduled start time. In such embodiments, the programming content start alert may not to be scheduled to occur until a later time.

The notification provider module 218 provides an interactive opportunity notification associated with the programming content based on generation of the programming content start alert by the alert generation module 216. In general, the interactive opportunity notification notifies the user of the mobile electronic device 102 that upcoming programming content has one or more interactive opportunities. In an example embodiment, interactive opportunity notification notifies the user of the mobile electronic device 102 that upcoming programming content has one or more interactive opportunities that are subliminally encoded within the programming content.

In some embodiments, the notification provider module 218 illuminates a lighting component on the mobile electronic device 102 based on generation of the programming content start alert. In some embodiments, the notification provider module 218 reproduces a sound on the mobile electronic device 102 based on the generation of the programming content start alert. In some embodiments, the notification provider module 218 causes a vibration component of the mobile electronic device 102 to activate based on the generation of the programming content start alert.

In some embodiment, the notification provider module 218 transmits the interactive opportunity notification to an additional device. The additional device may be coupled to the mobile electronic device 102, may be an additional mobile electronic device 102, may be in communication with the mobile electronic device 102, or the like. The transmission may be through the network 104, or may be otherwise transmitted (e.g., through BLUETOOTH or infrared between the devices). Upon receipt of the interactive opportunity notification, the additional device may alerts the user of the interactive opportunity notification immediately or at a designated time. The additional device may provide the interactive opportunity notification instead of or in addition to the mobile electronic device 102.

In some embodiments, the channel module 220 determines a current channel of the signal source 110, changes a channel on the signal source 110 based on the schedule start time, or both. The changing of the channel on the signal source 110 may enable the user of the mobile electronic device 102 to receive the programming content containing the interactive opportunity for which the user may otherwise not remember to view or remember the channel on which to view the opportunity. In some embodiments, the interactive opportunity notification may include a channel change notification based on the determination of the current channel by the channel module 220. The channel change notification advises the user of the mobile electronic device 102 to change the channel, typically without actually changing the channel itself.

In some embodiments, the channel module 220 changes the channel through use of an infrared transceiver on the mobile electronic device 102. In some embodiments, the channel module 220 changes the channel through contacting the signal source 110 through the network 104. In some embodiments, the channel module 220 changes the channel by communicating with an additional device (e.g., a separate remote control) and instructing the additional device to change the channel of the signal source 110.

Once the user of a device incorporating the device notification subsystem 112 receives the interactive opportunity notification, the user may view the programming content and take advantage of the one or more interactive opportunities present in the programming content.

In some embodiments, user interactions are processed during presentation of the programming content by the user interaction processor module 222 and one or more promotional or interactive opportunities are enabled by the promotional opportunity enablement module 226 based on the processing of at least some of the user interactions.

In some embodiments, the gaming module 224 decodes gaming data from the encoded pattern based on a determination that the scheduled start time has occurred when the current device time is within a start time qualification of the schedule start time, synchronizes the gaming data with a gaming application operating on the mobile electronic device, presents device content based on the synchronizing of the gaming data with the gaming application, and processes gaming interactions from a user during presentation of the programming content and the device content. One or more promotional opportunities may then be enabled by the promotional opportunity enablement module 226 based on the processing of at least some of the gaming interactions. The promotional opportunity enablement module 226 may otherwise enable promotional opportunities.

Figure 3:
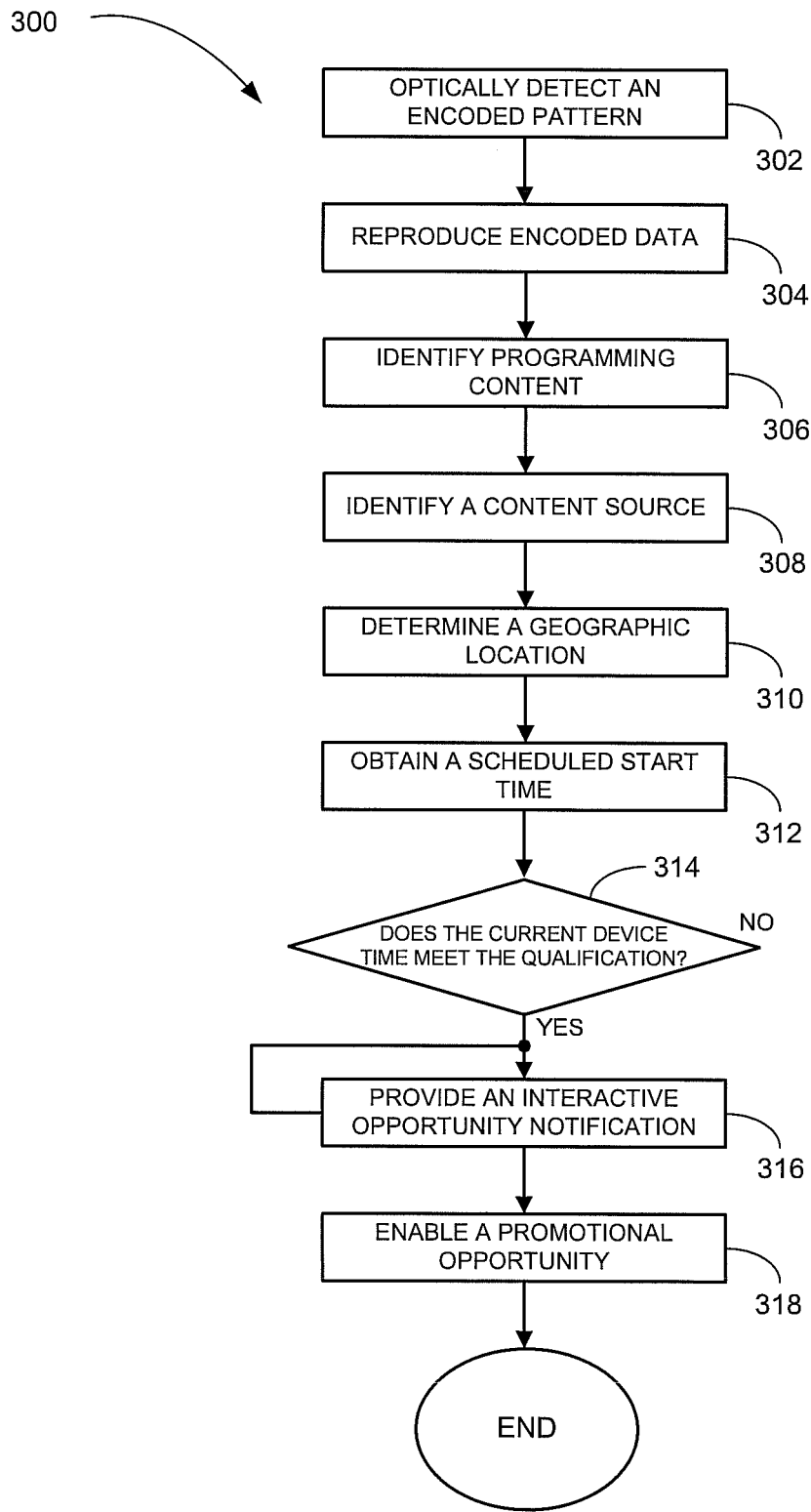
FIGS. 3 and 4 are flowcharts illustrating methods for device notification, according to example embodiments.

FIG. 3 illustrates a method 300 for device notification according to an example embodiment. The method 300 may be performed by the mobile electronic device 102 (see FIG. 1) of the system 100, or it may be otherwise performed. In an example embodiment, the method 300 provides a user of the mobile electronic device 102 with a notification of the future broadcasting of programming content with interactive opportunities At block 302, an encoded pattern is optically detected from source media 106. In some embodiments, the encoded pattern is associated with programming content of the content source 108. The encoded pattern is decoded to reproduce encoded data at block 304.

The programming content is identified based on reproduction of the encoded data at block 306. In some embodiments, the content source is identified at block 308 based on the reproduction of the encoded data.

A geographic location of the mobile electronic device 102 may be determined at block 310. In some embodiments, the geographic location is determined by obtaining global positioning system (GPS) data and identifying the geographic location of the mobile electronic device 102 based on the GPS data. In some embodiments, the geographic location is determined by identifying a time zone setting and identifying the geographic location of the mobile electronic device 102 based on the time zone setting.

A scheduled start time of the programming content is obtained at block 312. The schedule start time may be identified or received. In some embodiments, the scheduled start time of the programming content is identified based on the decoding of the encoded pattern. In some embodiments, the scheduled start time of the programming content is identified based on the geographic location of the mobile electronic device. In some embodiments, the schedule start time of the programming content is received from the content source of the programming content. The scheduled start time may be received through e-mail, SMS, or may be otherwise received.

At decision block 314, a determination is made as to whether a current device meets a notification time qualification for the scheduled start time. If a determination is made that the current device time does not meet the notification time qualification, the method 300 may return to decision block 314. If a determination is made that the current device meets the notification time qualification, a programming content start alert is generated at block 316.

An interactive opportunity notification associated with the programming content is provided at block 318 based on generation of the programming content start alert.

The interactive opportunity notification may be provided by illuminating a lighting component on the mobile electronic device, reproducing a sound on the mobile electronic device, and/or causing a vibration component with the mobile electronic device to activate. The interactive opportunity notification may be otherwise provided.

In some embodiments, a promotional opportunity is enabled at block 320. The promotional opportunity may be enabled based on the user of the mobile electronic device taking advantage of the interactive opportunity of which they were notified through the interactive opportunity notification. By way of example, the promotional opportunity may be presented (e.g., as an advertisement or a promotion) on a display of the mobile electronic device 102 after the user has received programming content that originated from the content source 108 that had encoded promotional data.

In an example embodiment, user interactions during presentation of the programming content are processed (e.g., on the mobile electronic device 102) and a promotional opportunity is enabled based on the processing of at least some of the user interactions.

In some embodiments, gaming data is also decoded from the encoded pattern of the source media 106. The gaming data may be decoded from the same source media 106 from which the encoded pattern that contained the encoded data, or may be encoded from different source media 106, or from a difference encoded pattern on the same source media 106. The gaming data may include puzzle data, map data, character data, weapon data, or any other data that may contribute or enhance game play. For example, the gaming data may be puzzles for the WHEEL OF FORTUNE game show, answers and/or questions for the JEOPARDY game show, questions from the WHO WANTS TO BE A MILLIONAIRE game show, or the like. The gaming data may provide a patch or other type of update for a video gaming operating on the mobile electronic device 102. The gaming data is synchronized with a gaming application operating on the mobile electronic device 102. The device content is presented on the mobile electronic device 102 based on the synchronizing of the gaming data with the gaming application. The presentation of the device content may include an audio/video presentation to which the user can interact or control based on usage of the mobile electronic device 102. The gaming interactions from a user are processed during presentation of the programming content and the device content. The gaming interactions may include guessing letters or the solution to a puzzle, moving a character through a maze, or the like. A promotional opportunity is then enabled based on the processing of at least some of the gaming interactions.

By way of example, the mobile electronic device 102 may optically detect a bar code associated with a particular television program from a nationwide newspaper such as USA TODAY. The mobile electronic device 102 may use GPS data and/or a time zone designated on the mobile electronic device in determining when to alert the user of an upcoming television program (e.g., thirty minutes before start time of the program) that has an interactive opportunity. During the television program, the mobile electronic device 102 may receive subliminally encoded data directly from a display device (e.g., a television) and be provided with an electronic coupon, enhanced game play, or the like based on the receiving and decoding of the subliminally encoded data.

Figure 4:
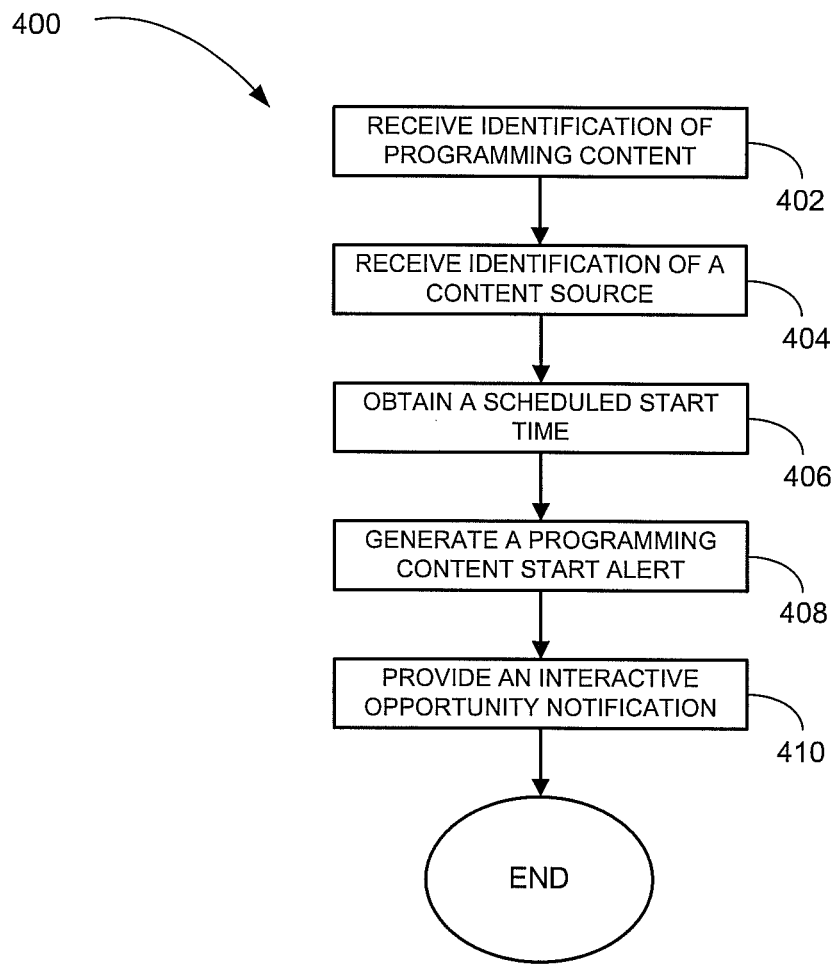

FIG. 4 illustrates a method 400 for encoded information processing according to an example embodiment. The method 400 may be performed by the mobile electronic device 102 (see FIG. 1) of the system 100, or it may be otherwise performed. In an example embodiment, the method 400 provides a user of the mobile electronic device 102 with a notification of the future broadcasting of programming content with interactive opportunities.

Identification data associated with programming content is received at block 402. In some embodiments, identification data associated with of a content source 108 of the programming content may be received at block 404.

In some embodiments, the identification data associated with the programming content, the identification data associated with the content source 108, or both is encoded in an audio portion and/or a video portion of a content signal (e.g., a video signal) reproduced by the signal source 110. For example, a television show presented on the signal source 110 in the form of a display device may present an encoded content signal having the identification data encoded through use of dual tone multiple frequency (DTMF), luminance modulation, chrominance modulation, or the like.

In some embodiments, the identification data of the programming content, the content source of the programming content, or both may be received through short message service (SMS), e-mail, or may be otherwise received. In example embodiment, the identification data may be provided directly or indirectly from a server (e.g., an APPLE ITUNES server).

The scheduled start time of the programming content is obtained at block 406. In some embodiments, the scheduled start is obtained based on the use of the identification data. In some embodiments, the programming content is video programming content. In some embodiments, the programming content is audio programming content.

The programming content start alert is generated when a current device time (e.g., of the mobile electronic device 102) meets a time qualification of the scheduled start time at block 408.

The interactive opportunity notification is provided (e.g., of the mobile electronic device 102) based on generation of the programming content start alert at block 410.

Figure 5:
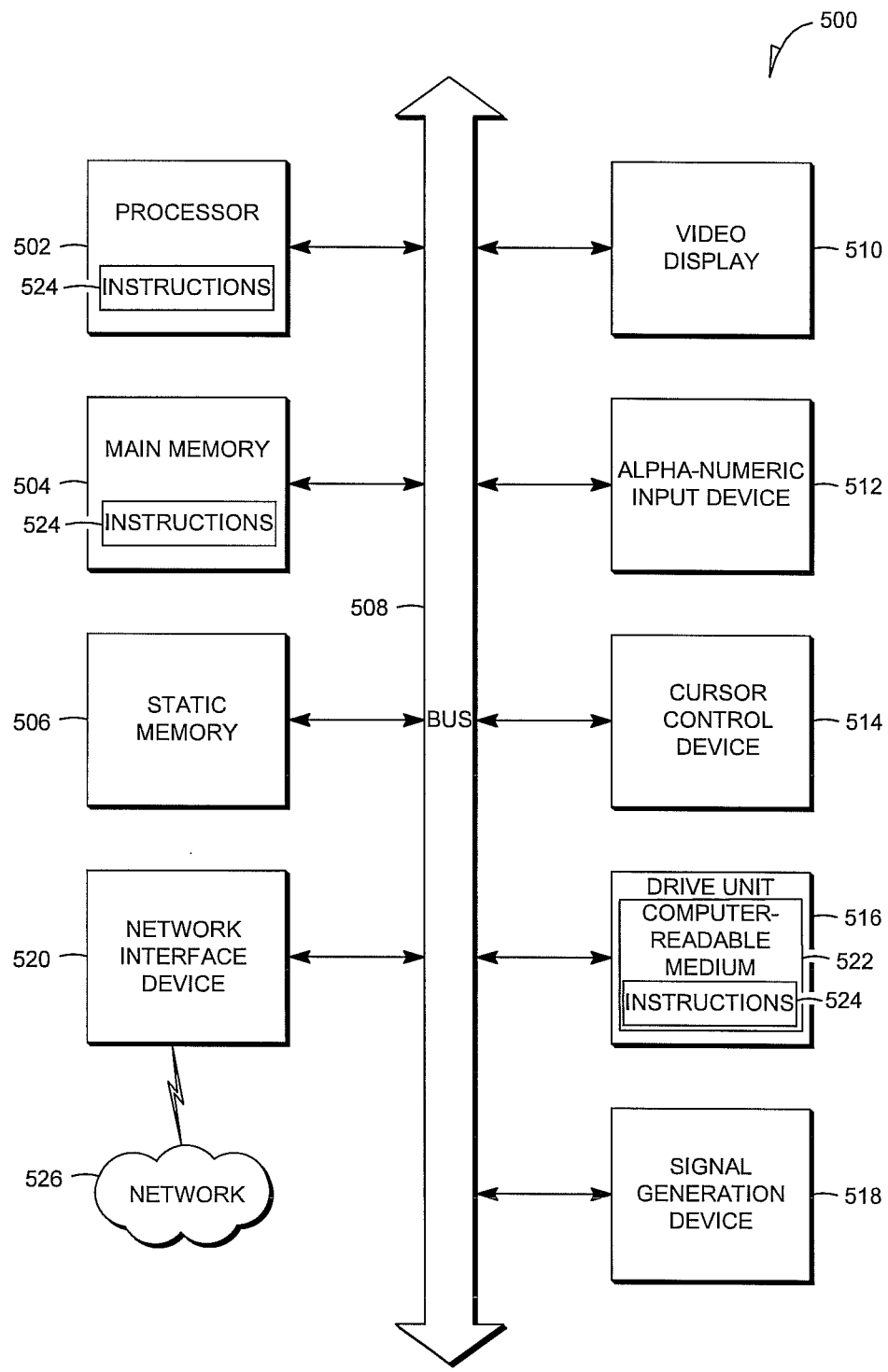
FIG. 5 is a block diagram of a machine in the example form of a computer system within which a set of instructions for causing the machine to perform any one or more of the methodologies discussed herein may be executed.

FIG. 5 shows a block diagram of a machine in the example form of a computer system 500 within which a set of instructions may be executed causing the machine to perform any one or more of the methods, processes, operations, or methodologies discussed herein. The mobile electronic device 102 (see FIG. 1) may include the functionality of the one or more computer systems 500. The gaming source server 106, the signal source 108, or both may include the functionality of the one or more computer systems 500.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 512 (e.g., a central processing unit (CPU) a graphics processing unit (GPU) or both), a main memory 504 and a static memory 506, which communicate with each other via a bus 508. The computer system 500 may further include a video display unit 150 (e.g., a liquid crystal display (LCD) or a cathode ray tube (CRT)). The computer system 500 also includes an alphanumeric input device 512 (e.g., a keyboard), a cursor control device 514 (e.g., a mouse), a drive unit 516, a signal generation device 518 (e.g., a speaker) and a network interface device 520.

The drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 512 during execution thereof by the computer system 500, the main memory 504 and the processor 512 also constituting machine-readable media.

The software 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention. The term "machine-readable medium" shall accordingly be taken to include, but not be limited to, solid-state memories, and optical media, and magnetic media.

Certain systems, apparatus, applications or processes are described herein as including a number of modules. A module may be a unit of distinct functionality that may be presented in software, hardware, or combinations thereof. When the functionality of a module is performed in any part through software, the module includes a machine-readable medium. The modules may be regarded as being communicatively coupled.

The inventive subject matter may be represented in a variety of different embodiments of which there are many possible permutations.

In an example embodiment, an encoded pattern may be optically detected from source media. The encoded pattern may be associated with programming content of a content source. The encoded pattern may be decoded to reproduce encoded data. The programming content may be identified based on reproduction of the encoded data. A scheduled start time of the programming content may be obtained. When a current device time is within a notification time qualification of the scheduled start time, a programming content start alert may be generated. An interactive opportunity notification associated with the programming content may be provided based on generation of the programming content start alert.

In an example embodiment, identification of programming content and a content source of the programming content may be received. A scheduled start time of the programming content may be obtained. When a current device time is within a time qualification of the scheduled start time, a programming content start alert on the mobile electronic device may be generated. An interactive opportunity notification may be provided based on the generation of the programming content start alert.

Thus, methods and systems for encoded information processing have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method comprising:
   optically detecting an encoded pattern from source media by a mobile electronic device, the encoded pattern including gaming data that is to be used to play a gaming application on the mobile electronic device during broadcast presentation of programming content provided by a content source;
   decoding the encoded pattern by the mobile electronic device to obtain the gaming data and encoded data;
   identifying the programming content by the mobile electronic device based on the encoded data that is decoded from the encoded pattern;
   obtaining a scheduled start time of the programming content by the mobile electronic device;
   when a current device time of the mobile electronic device is within a notification time qualification of the scheduled start time, generating a programming content start alert on the mobile electronic device that notifies a user of the mobile electronic device of when the programming content is to be broadcast presented;
   presenting the gaming application on the mobile electronic device, the gaming application using the gaming data to provide gaming interactions during the broadcast presentation of the programming content;
   processing gaming instructions that are input into the mobile electronic device from the user in response to the gaming interactions presented on the mobile electronic device and during the broadcast presentation of the programming content; and
   presenting a promotional opportunity via the mobile electronic device based on the processing of one or more of the gaming instructions.

2. The method of claim 1, wherein the obtaining of the schedule start time comprises:
   identifying the scheduled start time of the programming content based on the decoding of the encoded pattern.

3. The method of claim 2, further comprising:
   determining a geographic location of the mobile electronic device,
   wherein the identifying of the scheduled start time is based on a determination of the current geographic location.

4. The method of claim 3, wherein the determining of the geographic location comprises:
   obtaining global positioning system (GPS) data by the mobile electronic device; and
   identifying the geographic location of the mobile electronic device based on the GPS data.

5. The method of claim 1, wherein the determining of the geographic location comprises:
   identifying a time zone setting by the mobile electronic device; wherein obtaining the scheduled start time is performed based on the time zone setting.

6. The method of claim 1, further comprising:
   identifying the content source based on the encoded data.

7. The method of claim 1, wherein the obtaining of the start time comprises:
   receiving the scheduled start time of the programming content from the content source of the programming content.

8. The method of claim 1, wherein the presenting of the promotional opportunity comprises:
   illuminating a lighting component on the mobile electronic device based on the generating of the programming content start alert.

9. The method of claim 1, wherein the presenting of the promotional opportunity comprises:
   reproducing a sound by the mobile electronic device based on the generating of the programming content start alert.

10. The method of claim 1, wherein the presenting of the promotional opportunity comprises:
    causing a vibration component with the mobile electronic device to activate based on the generating of the programming content start alert.

11. The method of claim 1, wherein the encoded pattern is a bar code.

12. The method of claim 1, wherein the source media includes at least one of printed matter, a display device, or combinations thereof.

13. The method of claim 1, wherein the encoded pattern is visible to an ordinary viewer of the source media.

14. The method of claim 1, wherein the encoded pattern is subliminally encoded within the source media such that the encoded pattern is not visible to a human being.

15. The method of claim 1, wherein the programming content is radio programming content.

16. The method of claim 1, wherein the programming content is television programming content.

17. The method of claim 1, wherein the gaming data is decoded from the encoded pattern when the current device time is within a start time qualification of the scheduled start time, and further comprising:
    synchronizing the gaming data with the gaming application operating on the mobile electronic device; and
    presenting device content on the mobile electronic device based on the synchronizing of the gaming data with the gaming application.

18. A computer-readable storage medium comprising computer readable instructions, which when executed by a processor, cause the processor to perform the following operations:
    optically detect an encoded pattern from source media by a mobile electronic device, the encoded pattern including gaming data that is to be used to play a gaming application on the mobile electronic device during broadcast presentation of programming content provided by a content source;
    decode the encoded pattern by the mobile electronic device to reproduce encoded data obtain the gaming data and encoded data;
    identify the programming content by the mobile electronic device based on the encoded data that is decoded from the encoded pattern;
    obtain a scheduled start time of the programming content by the mobile electronic device;
    when a current device time of the mobile electronic device is within a notification time qualification of the scheduled start time, generate a programming content start alert on the mobile electronic device that notifies a user of the mobile electronic device of when the programming content is to be broadcast presented;

present the gaming application on the mobile electronic device, the gaming application using the gaming data to provide gaming interactions during the broadcast presentation of the programming content;

process gaming instructions that are input into the mobile electronic device from the user in response to the gaming interactions presented on the mobile electronic device and during the broadcast presentation of the programming content; and present a promotional opportunity via the mobile electronic device based on the processing of one or more of the gaming instructions.

19. A system comprising:

a processor and a memory coupled to a mobile electronic device;

an optical detection module deployed in the memory and executed by the processor to optically detect an encoded pattern from source media, the encoded pattern including gaming data that is to be used to play a gaming application on the mobile electronic device during broadcast presentation of programming content provided by a content source;

an encoded pattern decoder module deployed in the memory and executed by the processor to decode the encoded pattern that is optically detected by the optical detection module to obtain the gaming data and encoded data;

a programming content identification module deployed in the memory and executed by the processor to identify the programming content on the mobile electronic device based on the encoded data that is obtained by the encoded pattern decoder module;

a start time module deployed in the memory and executed by the processor to obtain a scheduled start time of the programming content that is identified by the programming content identification module;

an alert generation module deployed in the memory and executed by the processor to generate a programming content start alert when a current device time of the mobile electronic device is within a notification time qualification of the scheduled start time, the programming content start alert notifying a user of the mobile electronic device of when the programming content is to be broadcast presented;

a gaming module deployed in the memory and executed by the processor to present the gaming application on the mobile electronic device, the gaming application using the gaming data to provide gaming interactions during the broadcast presentation of the programming content, the gaming module also executed by the processor to process gaming instructions that are input into the mobile electronic device from the user in response to the gaming interactions presented on the mobile electronic device and during the broadcast presentation of the programming content; and a notification provider module deployed in the memory and executed by the processor to present a promotional opportunity via the mobile electronic device based on one or more of the gaming instructions that are processed by the gaming module.

20. The method of claim 1, wherein the programming content is broadcast presented by plural different content sources at plural different times, and further comprising:

identifying a location of the mobile electronic device; and determining which of the content sources is broadcast presenting the programming content at the scheduled start time and when the programming content will be broadcast presented at the location of the mobile electronic device based on the location of the mobile electronic device; wherein the programming content start alert is generated on the mobile electronic device when a current device time of the mobile electronic device at the location of the mobile electronic device is within a time qualification of the scheduled start time.

* * * * *